(12) United States Patent
Dubs et al.

(10) Patent No.: US 8,155,588 B2
(45) Date of Patent: Apr. 10, 2012

(54) SEAMLESS HAND-OFF OF BLUETOOTH PAIRINGS

(75) Inventors: Justin Tyler Dubs, Durham, NC (US); James Joseph Thrasher, Efland, NC (US); Michael Terrell Vanover, Raleigh, NC (US); Steven Richard Perrin, Raleigh, NC (US); Sean Michael Ulrich, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1087 days.

(21) Appl. No.: 11/965,514

(22) Filed: Dec. 27, 2007

(65) Prior Publication Data

US 2009/0170521 A1 Jul. 2, 2009

(51) Int. Cl.
*H04B 7/00* (2006.01)

(52) U.S. Cl. ....... 455/41.2; 455/418; 455/450; 455/519; 455/567; 455/569.1

(58) Field of Classification Search ................. 455/41.2, 455/41.3, 418, 516–518, 519, 567, 569.1; 370/260; 379/202.01
See application file for complete search history.

(56) References Cited

U.S. PATENT DOCUMENTS

| | | | |
|---|---|---|---|
| 2003/0220114 A1* | 11/2003 | Langensteiner et al. | 455/450 |
| 2004/0110508 A1* | 6/2004 | Haartsen | 455/445 |
| 2006/0036733 A1 | 2/2006 | Fujimoto et al. | |
| 2007/0274259 A1 | 11/2007 | Sayegh et al. | |
| 2008/0146265 A1* | 6/2008 | Valavi | 455/550.1 |
| 2008/0261524 A1* | 10/2008 | Grushkevich | 455/41.2 |

FOREIGN PATENT DOCUMENTS

WO WO-0241587 A2 5/2002

OTHER PUBLICATIONS

"International Application Serial No. GB0821491.8, Search Report mailed Feb. 16, 2008", 4 pgs.

* cited by examiner

*Primary Examiner* — Dwayne Bost
*Assistant Examiner* — Inder Mehra
(74) *Attorney, Agent, or Firm* — Schwegman, Lundberg & Woessner, P.A.

(57) ABSTRACT

Apparatus, methods, and systems are disclosed for pairing a first wireless device with a second wireless device and establishing an identifier. The first wireless device transmits to the second wireless device from the first wireless device with the identifier. The first wireless device shares the identifier with a third wireless device. This allows the third device to transmit to the second wireless device appearing as the first wireless device. The first wireless device stops transmitting while the third wireless device transmits. Since the third wireless device used the identifier for the first wireless device, the second wireless device believes is communicating with the first wireless device.

20 Claims, 3 Drawing Sheets

SEAMLESS HAND-OFF OF BLUETOOTH PAIRINGS

BACKGROUND

Bluetooth is an industrial specification for wireless personal area networks (PANs). Bluetooth provides a way to connect and exchange information between devices such as mobile phones, laptops, personal computers, printers, digital cameras, and video game consoles over a secure, globally unlicensed short-range radio frequency. The Bluetooth specifications are developed and licensed by the Bluetooth Special Interest Group.

A fundamental Bluetooth wireless technology strength is the ability to simultaneously handle both data and voice transmissions. This enables users to enjoy variety of innovative solutions such as a hands-free headset for voice calls, printing and fax capabilities, and synchronizing personal digital assistants (PDA), laptop, and mobile phone applications to name a few.

The inventors have determined that for cost reasons, most Bluetooth devices (such as headsets) can only be paired with one Bluetooth device at a time. Unfortunately, this means that to listen to music on a personal computer as well as answer calls on a cellular phone it may require either two headsets or to repeatedly use the respective Bluetooth control panels to change what device with which the headset is paired. This means that if the headset is playing music from the personal computer while a call comes in, using the headset to answer the call will be difficult to manage and if the pairing is changed too slowly the call may be lost.

DETAILED DESCRIPTION

Figure 1:
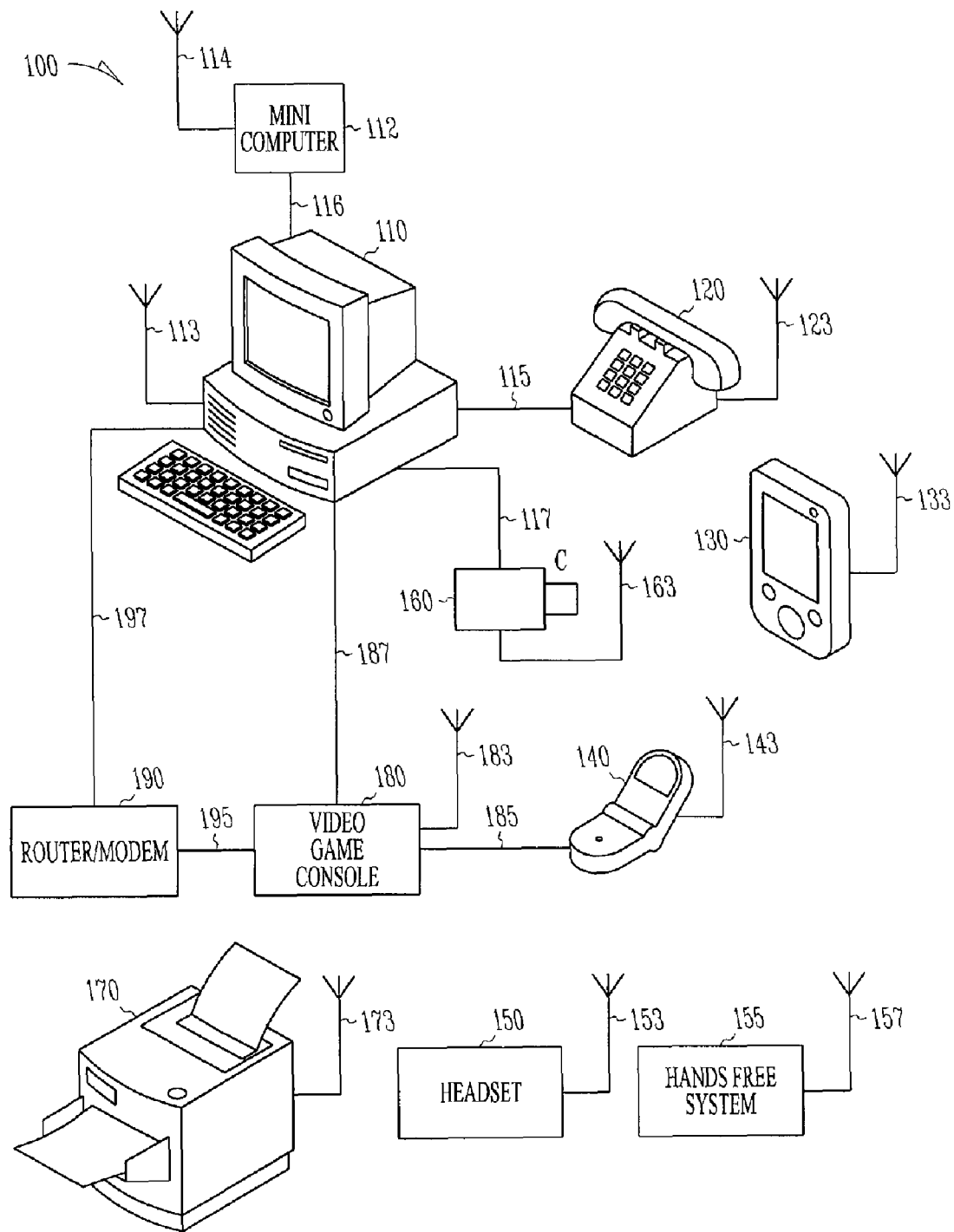
FIG. 1 is a system diagram according to an example embodiment.

FIG. 1 is a block diagram of a system 100 according to an example embodiment. The system 100 comprises a personal computer 110 with a Bluetooth transceiver 113. The transceiver comprising both a transmitter and a receiver. The personal computer 110 may be connected via a USB (universal serial bus) connection or via a Bluetooth connection to a phone 120. It is understood that a personal computer includes a laptop computer. It is also understood that a USB connection maybe substituted with other wired or wireless connections, such as Firewire, Wi-Fi, Ethernet or others. The personal computer 110 may also be connected to a mini-computer 112 having a Bluetooth transceiver 114. The mini-computer may be coupled to the personal computer through a USB connection 116 or inserted into a PCMCIA card slot (personal computer memory card international association) in the personal computer 110. The mini-computer 112 may be adapted to transmit to a PDA 130 with a Bluetooth transceiver 133 or a cellular device 140 such as a smart phone or cellular phone with a Bluetooth transceiver 143. The mini-computer may operate when the personal computer is off or in a standby mode to transmit web content to the PDA 130 or cellular phone 140. When the personal computer 110 is operating, the personal computer 110 may push content to the PDA 130 or cellular phone 140. When the personal computer 110 shuts down or goes into a sleep mode, the mini computer 112 may transmit using the identifier. The mini-computer 112 may appear to the PDA 130 or cellular phone 140 as the same device as the personal computer 110 by using the same identifier as the personal computer 110. When the computer 110 goes into sleep mode it passes the baton to the minicomputer 112.

With advancements in video game consoles, a video game console 180 may have a Bluetooth transceiver 183, and may be connected via a USB connection 185 to the cellular phone 140 and via a USB connection 187 to the personal computer 110. Video game console 180 and personal computer 110 may be connected via a USB connection 195 and 197 respectively to a router/modem 190. The router/modem 190 may provide access to the internet. In addition a camera 160 may have a Bluetooth transceiver 163 and be connected via a USB connection 117 to personal computer 110. The system may also include a headset 150 with a Bluetooth transceiver 153, and a hands free system 155 with a transmitter receiver 157. The hands free system 155 may be for example, a hands free speaker and microphone for operation in an automobile. In one embodiment, the USB connections may also be wireless connections including Bluetooth or other wireless connections such as a wide area network or Wi-Fi. The system may also include a printer 170, having a Bluetooth transceiver. While the list of Bluetooth devices included in the system 100 is large, the list is not exhaustive and it should be understood by those skilled in the art that other Bluetooth based devices may be used with system 100. It should be understood that other wiring configurations of system 100 are possible. However, in this example they have been limited to avoid confusion.

Bluetooth devices communicate via a protocol distributed by the Bluetooth Special Interest Group founded in 1998. Bluetooth devices are paired with each other by sharing information. A link key is a key shared by devices that communicate together, the key authenticates each device to the other device. Communication identifiers may comprise one or more of, an identifier or address, a link key, a Bluetooth profile such as advanced audio distribution profile (A2DP) or audio/video remote control profile (AVRCP or others, a connection key, or session key and connection-type specific context (current volume level, mute on/off etc.). It should also be noted that while the description focuses on Bluetooth communications, it is understood that other forms of wireless communication may substitute for Bluetooth.

The communication identifiers of the personal computer 110 may be characterized as a "baton". The personal computer 110 may be referred to as the first wireless device and it will communicate with a second wireless device, for example headset 150. As an example, the personal computer 110 may send music to the headset 150 via Bluetooth communication protocols. If this "baton" or identifier is provided to a third wireless device in the system, for example the phone 120, the phone 120 will appear to headset 150 as the personal computer 110. The identifier may be provided to the phone via the USB connection, a Wi-Fi connection or via a separate logical channel on the same wireless transport mechanism. When the phone 120 has the baton, the personal computer 110 will stop transmitting to the headset 150, and the phone will transmit to the headset 150. Whichever device, the phone 120 or the personal computer 110, has the baton may communicate to the headset 150 via the Bluetooth connection. This baton normally resides with the personal computer 110, but can be requested and taken ownership of by the phone 120 when a call is placed or received. To avoid the limitation whereby most Bluetooth devices may only be paired with one other Bluetooth device at a time, the baton is passed to the phone 120 to permit the phone 120 to emulate or appear as the personal computer 110. Essentially the phone 120 is programmed with the same address and link key as the personal computer 110 so that to the headset 150, personal computer 110 and the phone 120 appear indistinguishable.

It is possible that multiple wireless devices may have access to the baton. For example, a headset 150 may be paired with a video game console 180. The video game console 180 may have a connection either via a USB connection or Wi-Fi connection 195 to a router/modem 190. The router/modem 190 may be connected to the internet and may also provide a connection to the personal computer 110. The video game console 180 may through the router/modem 190 provide voice communications through the internet. These voice communications may be relayed via the Bluetooth transceiver 183 to headset 150. The video game console 180 will provide an identifier that may be characterized as a baton when it is paired with headset 150. A cellular phone may have a USB or Wi-Fi connection 185 with the video game console 180. When a call is received by the cellular phone 140, the baton will be transferred from the video game console 180 to the cellular phone 140. Concurrently the video game console 180 will stop transmitting to the headset 150. The headset will see the cellular phone 140 as the video game console 180 and the user may take the call on the cellular phone 140 with the headset 150. When the call is ended, the baton will be returned to the video game console 180. A call may be received by the personal computer 110 via a voice over internet protocol phone system working with personal computer 110. In this case the baton may be passed from the video game console 180 to the personal computer 110. When the call is completed the baton will be returned to the video game console 180. The headset 150 does not see the changes of devices. Thus the headset 150 believes that it is communicating with the video game console 180 the entire time.

Figure 2:
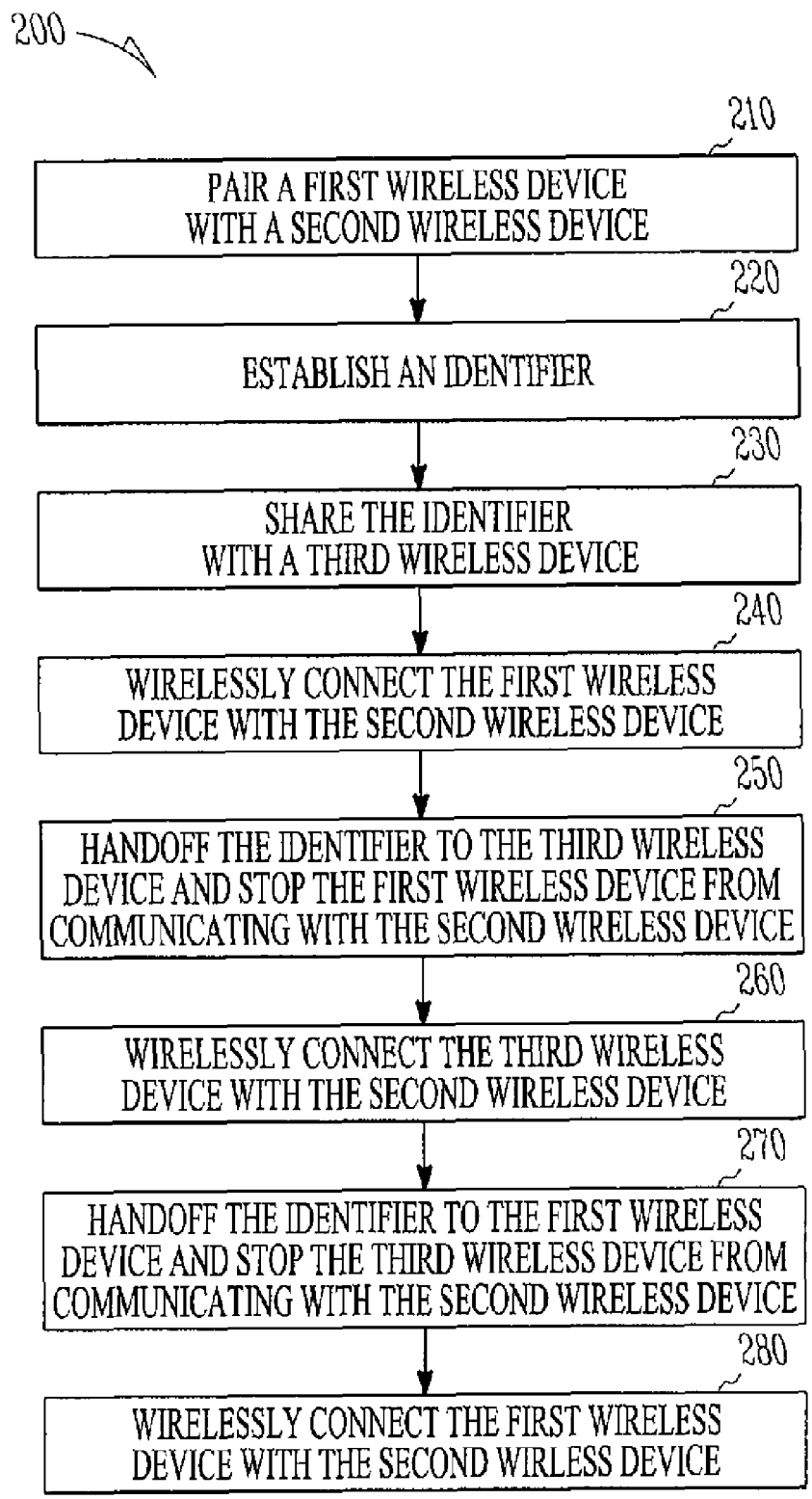
FIG. 2 is a method for transferring identifiers between devices when communicating with another device according to an example embodiment.

FIG. 2 is a method for transferring identifiers between devices when communicating with another wireless device according to an example embodiment. Method 200 may include activity 210 which may be to pair a first wireless device with a second wireless device. For example, a wireless device may be a personal computer such as personal computer 110 of FIG. 1. The second wireless device may be a wireless headset such as a headset 150 of FIG. 1. Activity 220 may be to establish an identifier for the first wireless device that the second wireless device will recognize and use to aid communication between the first wireless device and the second wireless device. Activity 230 may be to share the identifier with a third wireless device. The third wireless device may be a cellular phone such as cellular phone 140 of FIG. 1. Activity 240 may be for the first wireless device to connect with the second wireless device utilizing the identifier. Activity 250 may be to handoff the identifier to the third wireless device and stop the first wireless device from communicating with the second wireless device. The handoff may be symbolic as the third wireless device may be set up to transmit with the identifier. By shutting off or preventing the first wireless device from transmitting using the identifier, conflicts are avoided. Activity 260 may be to wirelessly connect the third wireless device with the second wireless device. The second wireless device will see the third wireless device as the first wireless device. Activity 270 may be to have the third wireless device hand the identifier to the first wireless device and stop transmitting. Activity 280 may be to wirelessly connect the first wireless device with the second wireless device.

Figure 3:
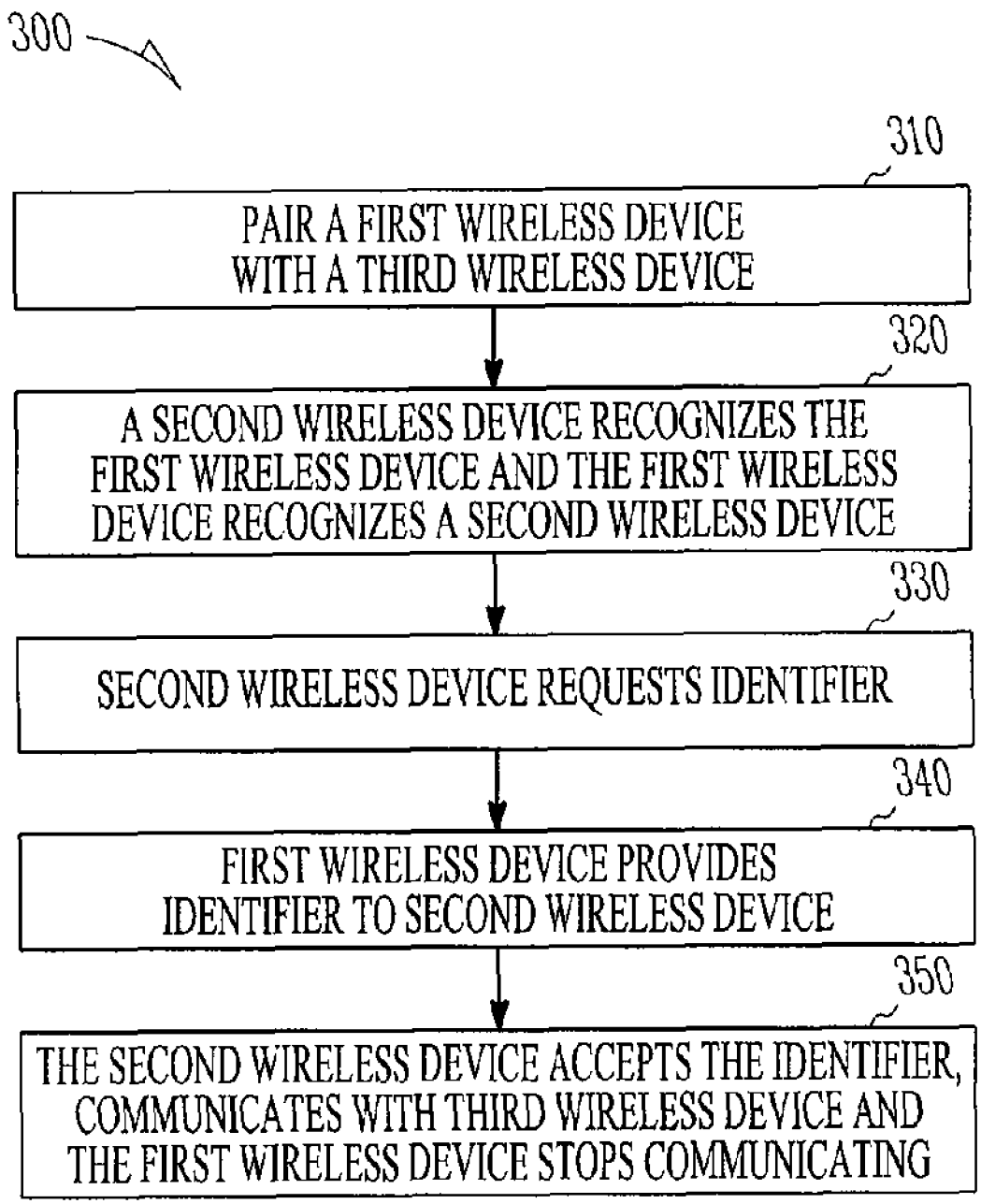
FIG. 3 is a method for transferring identifiers between Bluetooth devices when communicating with a third device according to an example embodiment.

FIG. 3 is a method for transferring identifiers between Bluetooth devices when communicating with a third device according to an example embodiment. At 310 a first wireless device may be paired with a third wireless device. The pairing of the third wireless device with the first wireless device will create an identifier recognized by the third wireless device. The third wireless device may be a cellular phone 140 and the first wireless device may be a headset 150 both of FIG. 1. At 320 a second wireless device recognizes the first wireless device and the first wireless device recognizes the second wireless device. The second wireless device may be the hands free system 155 of FIG. 1. At 330 the second wireless device requests the identifier from the first wireless device. At 340 the first wireless device may provide the identifier to the second wireless device. The second wireless device may accept the identifier at 350, communicate with the wireless device and the first wireless device may stop communicating with the device. During operation a user may take a phone call on their cell phone using their headset. They may approach their car and when they start the car, the hands free system may be turned on. When the user's headset and car see each other, the headset performs a push-based handoff to the hands free system and the hands free speaker phone performs a pull-based handoff from the headset. The identifier is transferred to the hands free system and the user now continues their call on the car's hands free system.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. The above description and figures illustrate embodiments of the invention to enable those skilled in the art to practice the embodiments of the invention. Thus the following claims are hereby incorporated into the Detailed Description, with each claim standing on its own as a separate embodiment.

What is claimed is:

1. An apparatus comprising:
   a first device having a transmitter, and an identifier, the first device configured to pair with a second device using the identifier;
   the first device configured to communicate with a third device having a transmitter, the third device configured to receive the identifier from the first device, wherein the third device transmits to the second device using the identifier; and
   wherein, the third device is configured to request the identifier from the first device, use the identifier to communicate with the second device, and to return the identifier to the first device at or around the time the third device is done communicating with the second device.

2. The apparatus of claim 1, wherein the identifier includes a link key.

3. The apparatus of claim 1, wherein the first device transmitter is off when the third transmitter transmits.

4. The apparatus of claim 3, wherein the third device transmitter is off when the first transmitter transmits.

5. The apparatus of claim 1, wherein the first device is a personal computer.

6. The apparatus of claim 5, wherein the third device is a phone.

7. The apparatus of claim 5, wherein the third device is a cellular device.

8. The apparatus of claim 1 wherein the first device is a video game console.

9. The apparatus of claim 8, wherein the third device is a cellular device.

10. The apparatus of claim 1, further comprising a fourth device having a transmitter, the fourth device configured to receive the identifier from the first device, wherein the fourth device transmits using the identifier.

11. The apparatus of claim 1, wherein the transmitter is a Bluetooth transmitter.

12. The apparatus of claim 1, wherein the transmitter is a Wi-Fi transmitter.

13. The apparatus of claim 1, wherein the third wireless device is a personal computer and the first wireless device is a mini-computer coupled to the personal computer.

14. The apparatus of claim 13, wherein the second device is one of a personal digital assistant, a smart phone, a personal computer, or a cellular phone.

15. A system comprising:
   a first device;
   a second device, the first device configured to pair with the second device, the first device having an identifier, the first device configured to transmit the identifier to the second device;
   a third device, the third device coupled to the first device, the third device configured to receive the identifier from the first device, and the third device configured to transmit the identifier to the second wireless device; and
   wherein, the third device is configured to request the identifier from the first device, use the identifier to communicate with the second device, and to return the identifier to the first device at or around the time the third device is done communicating with the second device.

16. The system of claim 15, wherein the first device is a personal computer, and the second device is a headset.

17. The apparatus of claim 15, wherein the first device transmits with a Bluetooth transmitter.

18. A method comprising:
   pairing a first wireless device with a second wireless device;
   establishing an identifier;
   transmitting to the second wireless device from the first wireless device, wherein the transmitting includes using the identifier;
   requesting the identifier from the first wireless device;
   transmitting to the second wireless device from the third wireless device, wherein the transmitting includes using the identifier; and
   returning the identifier to the first wireless device at or around the time the third device is done transmitting to the second device.

19. The method of claim 18, wherein when the first device is transmitting the third device cannot transmit.

20. The method of claim 19, wherein when the third device is transmitting the first device cannot transmit.

* * * * *